United States Patent

[11] 3,611,954

| [72] | Inventor | Elmer S. Monroe, Jr.<br>Newark, Del. |
|---|---|---|
| [21] | Appl. No. | 35,604 |
| [22] | Filed | May 8, 1970 |
| [45] | Patented | Oct. 12, 1971 |
| [73] | Assignee | E. I. du Pont de Nemours and Company<br>Wilmington, Del. |

[54] OXIDATIVE WASTE DISPOSAL
5 Claims, 1 Drawing Fig.

| [52] | U.S. Cl. | 110/7 R |
|---|---|---|
| [51] | Int. Cl. | F23g 5/12 |
| [50] | Field of Search | 110/7, 7 S,<br>8, 8 C, 8 A |

[56] References Cited
UNITED STATES PATENTS

| 2,808,011 | 10/1957 | Miller et al. | 110/7 |
|---|---|---|---|
| 3,056,467 | 10/1962 | Ravich | 110/8 |
| 3,362,360 | 1/1968 | Lowe | 110/7 |
| 3,395,654 | 8/1968 | Weisberg et al. | 110/8 |

Primary Examiner—Kenneth W. Sprague
Attorney—Harry J. McCauley

ABSTRACT: Process and apparatus for oxidative disposal of organic wastes heavily diluted with water by (1) vaporizing the dilute organic waste stream by directly heating waste sprayed counter to a combustion flame in a general envelope pattern and (2) catalytically oxidizing the hot vaporized effluent from the combustion flame to equilibrium products.

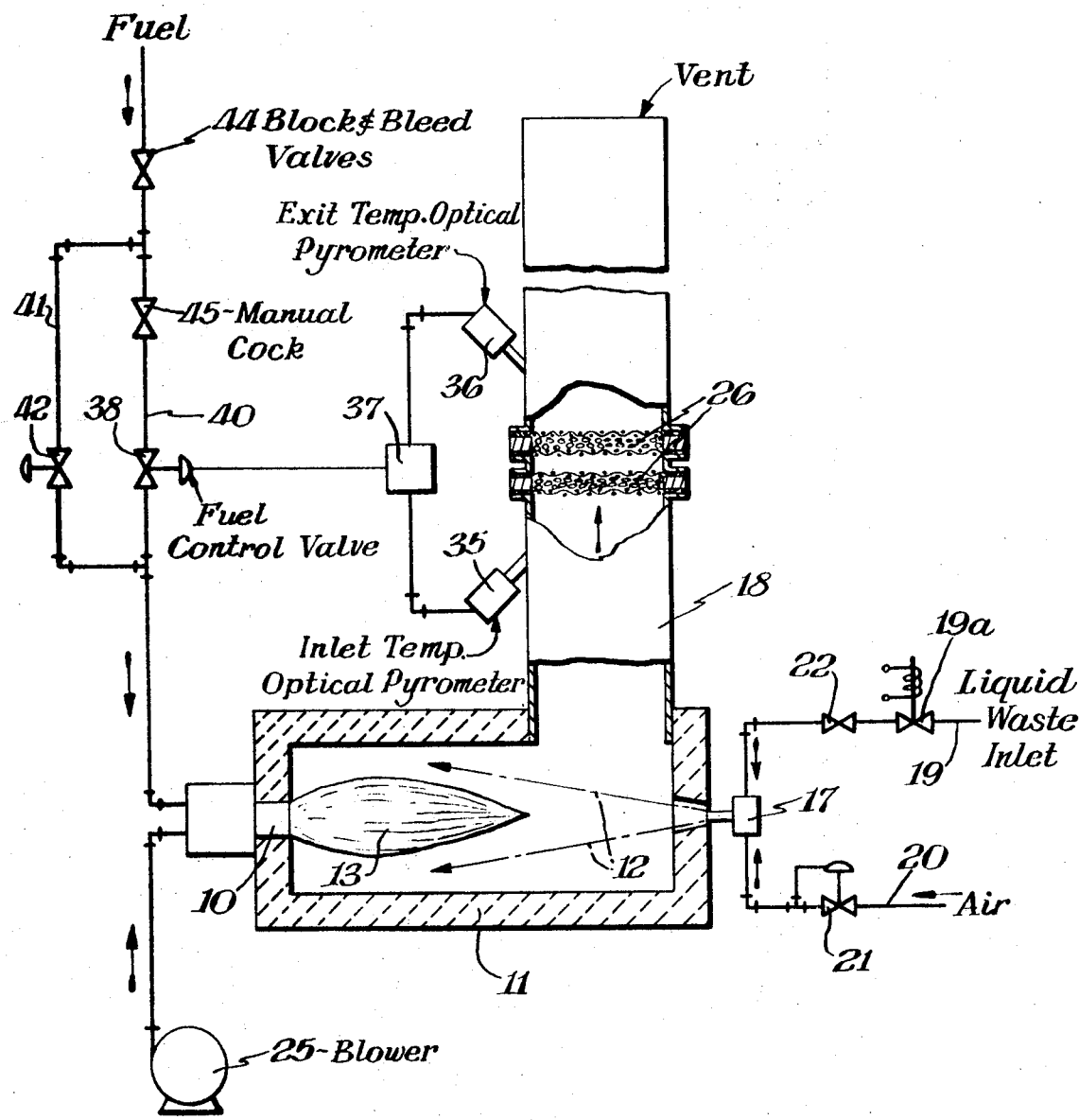

OXIDATIVE WASTE DISPOSAL

BRIEF SUMMARY OF THE INVENTION

Generally, this invention comprises a process for the oxidative disposal of liquid waste stream made up primarily of organic materials diluted with water comprising, in sequence, spraying the waste stream counter to a combustion flame predominantly as an envelope external thereof but in close proximity to the combustion flame, thereby vaporizing the waste stream, and exhausting the waste stream in heated vaporous form together with products of the combustion flame and air past an oxidation catalyst effective to oxidize a substantial portion of the organic material to equilibrium products, together with apparatus for carrying out the process.

DRAWING

The single FIG of this Application is a schematic cross-sectional side elevational view of a preferred embodiment of apparatus for oxidative waste disposal according to this invention.

A relatively large number of organic wastes are heavily diluted with water during manufacturing operations and present a serious problem of waste disposal. Such wastes cannot be easily burned, due to their high water content, nor can they be conveniently disposed of by chemical reaction without considerable expense and, sometimes, with formation of other products which, themselves, are objectionable if discharged to the sewer. An example of such substances are the finish oils utilized in textile yarn manufacture, which are relatively high-boiling materials and, also, very stable and retentive, so that they survive even severe chemical treatments aimed at their destruction. Inevitably, finish oils find their way into waste collection sewers, heavily diluted with washdown water, so that they cannot be restored to the process and constitute a waste which has to be disposed of.

Attempts have been made to incinerate wastes such as dilute finish oils by introducing them into combustion flames in regulated amounts, but these have not always been successful, the chilling effect frequently extinguishing the flame, or the organics being only partially burned to heavy soots or being incompletely vaporized, or burned, so that there is objectionable deposition on furnace walls, and other problems. Moreover, such combustion disposition processes have been exceedingly expensive, since approximately 5,000 B.t.u. of fuel have hitherto been required for each pound of aqueous waste.

This invention provides a highly economical and exceedingly effective process and apparatus for disposing of heavily diluted organic wastes, which accomplishes substantially complete destruction of the organics to final stable inoffensive equilibrium products, such as $CO_2$ and water, without accompanying soot, deposition or stack plume formation. The process operates by an extremely efficient vaporization of the waste stream projected as a countercurrent spray droplet envelope predominantly enclosing the burner flame. However, a substantial portion of the liquid waste can be sprayed head on into the flame front while still obtaining the benefits of this invention. Under these circumstances, the dilution water is completely vaporized and a substantial portion of the organic waste is burned in situ, to thereby supply a considerable portion of the heat required for continued vaporization. The uncombusted remainder of the organics is vaporized and preheated to an optimum temperature enabling substantially complete catalytic oxidation to inoffensive equilibrium products as an immediately following step. Analysis of effluent products has shown that complete waste disposal is effected by my process, and the heat consumption required has been as low as 1,300 B.t.u./lb. of finish oil waste having a water dilution as great as 90 percent.

A wide variety of fuels can be employed, such as propane, natural gas, or oil; however, the burner 10 is preferably one which produces an elongated flame and which can function with a range of 0–1500 percent excess air, or more, in order to safeguard the catalyst against excessive temperatures. Actually, conventional burners operating on lower excess air-to-fuel ratios of 0–200 percent can be made to work, except that it is then usually necessary to provide bypasses around the catalyst beds to protect them from overheating when the apparatus is started up. In a typical installation, using natural gas as the fuel, a North American Model 223 burner with pilot and flame scanner proved entirely suitable. The burner is preferably housed at one end of a horizontal cylindrical firebrick furnace chamber 11 and the water-diluted waste stream is introduced from the opposite end of the chamber as a countercurrent frustoconical spray envelope 12 preferably enclosing the flame cone 13 but not intermixing with it. Thus, the integrity of the flame is not disturbed, and quenching troubles are avoided. (I have found that a considerable amount of waste spray received head on into the outboard end of flame cone 13 can usually be tolerated without bad results, and therefore the design of waste spray nozzle is not particularly critical.)

The liquid waste is sprayed into chamber 11 through a conventional nozzle 17, which can typically be a pneumatic atomizing type; however, mechanical or sonic designs are equally operable. In one series of tests, I employed a pneumatic atomizer producing a round spray pattern in conical shape by external mixing of air and liquid waste. This atomizer had a small concentric annular air supply jet encircling a central liquid waste supply orifice, thereby producing a fine mist of droplets having diameters of 40 microns or less. This nozzle produced an envelope of quite consistent form and unit waste concentration, although, of course, some waste liquid droplets were incidentally deflected into the flame cone without, however, any detectable interference with operation.

It will be understood that rotary cup or pressure sprayers of a wide variety of designs can alternatively be utilized for the liquid waste introduction, and other atomizing media, such as steam, nitrogen or other gaseous phase substances can be substituted for air if the particular characteristics of the waste necessitate.

The spray cone encloses flame 13 as a near-tangent envelope 12, so that dilution water is speedily vaporized by the flame combustion products which exhaust, together with organic material surviving the combustion, out through vertical stack 18.

As shown, the organic waste to be disposed of is supplied under pressure to nozzle 17 through a line 19 and atomization air is supplied through a separate line 20 at a typical pressure of 23 p.s.i. lbs./sq.in. gage, maintained by air pressure regulator 21.

Additional air required for the catalytic oxidation hereinafter described is furnished by blower 25, which, as hereinbefore described, supplies air to burner 10 in excess of that needed for combustion. If necessary, yet another air supply line can be fitted to furnace chamber 11.

The hot exhaust vapors and gases drawn off via stack 18 are subjected to catalytic oxidation to carbon dioxide and water as taught in application Ser. No. 812,506, of common assignment herewith. The catalytic oxidation is achieved by passing the exhaust through one or, preferably, several series-arranged, gas-permeable catalyst trays 26 at temperatures in the range of about 100° C. to 250° C. Trays 26, which may be about 1½ inches thick, each containing about 200 lbs. of oxidation catalyst, are loaded with platinum or palladium metal catalysts carried on a calcined support presenting a surface area in excess of about 100m²/g., such as alumina or silica granules, or a ceramic honeycomb. These catalysts are very effective in achieving substantially complete oxidation of organic material surviving exposure to the preceding combustion. Also, the catalysts are capable of treating gases at relatively high space velocities in the range of about 25,000 to 75,000 cubic feet of gas at standard condition per hour per cubic foot of the catalyst composition.

The following are test results obtained with three different samples of textile finish oils diluted with water, Run No. 1 being waste as produced by an operating plant, whereas Run No. 2 was the same waste, but diluted with an approximately equal amount of water. Run No. 3 was textile finish oil waste obtained from a different mill. This latter was so concentrated, as received, that excessive combustion occurred in the combustion chamber ahead of the catalyst bed. Since the entire purpose of the test was to demonstrate that dilute solutions could be disposed of by a sequential combustion catalysis procedure, the sample was diluted as reported in the tabulation.

| Run | 1 | 2 | 3 |
|---|---|---|---|
| I. Data: | | | |
| 1. Waste sample | N | N | D |
| 2. Oil in sample (percent) | 6.67 | 6.67 | 18.33 |
| 3. Oil in test (percent) | 6.67 | 3.33 | 10.00 |
| 4. Feed rate (Lbs./hr.) | 19.8 | 21.8 | 18.2 |
| 5. Auxiliary fuel (B.t.u./hr.) | 28,500 | 28,500 | 23,000 |
| 6. $O_2$ to catalytic bed (percent) | 9.0 | 8.0 | 7.3 |
| 7. $O_2$ from catalytic bed (percent) | 5.5 | 6.0 | 2.8 |
| 8. Temperature to bed (° F.) | 365 (185° C.) | 350 (177° C.) | 364 (185° C.) |
| 9. Temperature from bed (° F.) | 659 (348° C.) | 507 (263° C.) | 756 (422° C.) |
| 10. Air pressure to burner (in. $H_2O$) | 1.6 | 1.6 | 2.0 |
| 11. Air pressure to mixer (in. $H_2O$) | 3.6 | 3.8 | 3.3 |
| 12. Pressure drop in bed (in. $H_2O$) | 1.8 | 1.6 | 2.1 |
| 13. Stack condition | Clear | Clear | Clear |
| II. Calculated results: | | | |
| 1. Excess air on burner (percent) | 45 | 45 | 50 |
| 2. Mols to bed | 2.79 | 2.30 | 2.53 |
| 3.[1] Volume to bed (c.f.h.) | 1,680 | 1,750 | 1,520 |
| 4. Velocity to bed (ft./min.) | 105 | 110 | 102 |
| 5. Fuel/waste ratio (B.t.u./Lbs.) | 1,440 | 1,320 | 1,260 |
| 6. Space velocity (ft./hr.) | 27,000 | 28,000 | 24,500 |

[1] Actual cubic feet.

From the foregoing, it will be seen that very low fuel/waste ratios of the order of 1,260–1440 B.t.u./lb. were achieved by use of my invention, indicating that a considerable amount of the heat required for dilution water vaporization was supplied by combustion within furnace chamber 11 of at least a portion of the organic wastes, which, even at this early stage, must have been quite completely dried in order to ignite. This shows that the vaporization of the countercurrent-sprayed input is very efficient. Moreover, no deposition was found on the inside walls of the furnace chamber, so that the vaporization was certainly complete and uniform throughout.

At the same time, there was no soot formation, and a very considerable part of the dispositive oxidation was certainly effected by the terminal catalytic oxidation, as indicated by a substantial temperature rise which occurred in the exhaust gases during their transit past trays 26.

The oxidation catalyst in trays 26 has a relatively long service life, usually measured in months, depending, of course, upon the nature of the waste disposed of. However, after protracted operation, a progressive decline in organics elimination efficacy occurs, finally evincing itself in the appearance of fumes in the exhaust venting stack 18. At this point, either new trays 26 can be slipped in in substitution for the vitiated catalyst, or the apparatus may be simply taken out of waste disposal service for a long enough time, usually only several hours, to increase the flame and available air supply of burner 10 to burn off deposits collected on the catalyst. Alternatively, the trays 26 can be removed and treated in a furnace wherein a two-step process of (1) steaming for 1 hour at about 475° C. followed by (2) introducing air and conducting a deposits burnoff is effective in regenerating. Actually, one tray 26 has been found to have an 80–85 percent system effectiveness in waste elimination while the other tray is removed for regeneration, so that continuous waste disposal operation is entirely practicable with this method.

It is preferred to incorporate a temperature control safeguarding the oxidation catalyst in trays 26 against heat damage, and this is readily achieved by installing temperature sensors such as optical pyrometers 35 and 36 ahead of and immediately following the last tray 26, respectively. An optimum temperature for a Pt or Pd oxidation catalyst has been found to be in the range 300°–500° F.; therefore, pyrometer 35 is reserved to this monitoring service by continuous signal output of a DC current of approximately 5 mV. to signal selector 37. Optical pyrometer 36 is adapted to measure the exit temperature of the exhaust from the second catalyst tray 26 and to override the normal control imposed by optical pyrometer 35 whenever this temperature reaches 800° F. or higher. A conventional throttling valve 38 responsive to the output of signal selector 37 is mounted in the main gas supply line 40, valve 38, under normal conditions, continuously increasing or decreasing gas flow to burner 10 to maintain the upside catalyst temperature within the range of 300°–500° F., but shutting off, as necessary, responsive to the override imposed by optical pyrometer 36 whenever the upside stack temperature approaches 800° F. There is an interlock control connection (not shown) to solenoid valve 19a in the liquid waste input which cuts off waste supply whenever throttling valve 38 closes completely. Since burner 10 is fitted with a pilot burner, there is automatic resumption of operation after an emergency gas shutoff following normal temperature restoration. (Provision can be readily made for automatic restoration of waste liquid supply after an outage, but, ordinarily, manual restoration by an operator is preferred in order to verify the cause of an unscheduled outage.) It has been found advantageous to provide a low-fire startup auxiliary to facilitate startup when the furnace is cold and before a steady-state combustion environment is attained. This simply comprises a bypass line 41 around throttling valve 38 in series connection with a pressure regulating valve 42. Manual valves 44 and 45 are provided in the main gas supply line 40 ahead of pressure regulating valve 42 and throttling valve 38, respectively. Thus, when valve 44 is opened and valve 45 is closed, gas is supplied at a sufficient rate to maintain startup low-fire operation of burner 10. During this period valve 22 in line 19 is closed so that waste liquid is not being introduced to furnace chamber 11. Thereafter, when optical pyrometer 35 senses that the upside catalyst tray 26 temperature is in the 300°–500° F. temperature range, it can be switched into control by simply opening valve 45, after which waste liquid supply can be commenced by opening valve 22.

What is claimed is:

1. The process of oxidative disposal of a liquid waste stream made primarily of organic materials diluted with water comprising, in sequence, spraying said waste stream counter to a combustion flame predominantly as an envelope external thereof but in close proximity to said combustion flame, thereby vaporizing said waste stream, and exhausting uncombusted components of said waste stream in heated vaporous form together with products of said combustion flame and air past an oxidation catalyst effective to oxidize a substantial portion of said organic material to equilibrium products.

2. The process of oxidative disposal of a liquid waste stream according to claim 1 wherein said oxidation catalyst is one of the group containing Pt and Pd.

3. Apparatus for oxidative disposal of a liquid waste stream made up primarily of organic materials diluted with water comprising, in combination, a furnace chamber provided with a combustion burner and a vaporous product exhaust port, a liquid waste stream introduction nozzle disposed substantially coaxial with said combustion burner and in opposition thereto, said nozzle distributing said liquid waste stream predominantly as a frustoconical envelope of liquid droplets substantially enclosing the flame of said combustion burner, means introducing air into said furnace chamber, and oxidation catalyst means in series flow circuit with said vaporous products exhaust port.

4. Apparatus for oxidative disposal of a liquid waste stream according to claim 3 wherein said combustion burner is of a type functioning with a range of 0–1500 percent excess air or more.

5. Apparatus for oxidative disposal of a liquid waste stream according to claim 3 provided with means controlling the fuel supply responsive to the sensed temperature in said exhaust port.